United States Patent [19]
Irr et al.

[11] Patent Number: 5,209,745
[45] Date of Patent: May 11, 1993

[54] BLOOD CRYOPRESERVATION CONTAINER

[76] Inventors: Joseph D. Irr, 386 Briar La., Newark, Del. 19711; John D. Walker, 107 Hanover Way, New Castle, Del. 19720; George F. Dunn, Jr., 306 W. Mantua Ave., Wenonah, N.J. 08090; Viet X. Nguyen, 22 Silverwood Blvd., Newark, Del. 19711

[21] Appl. No.: 601,637

[22] Filed: Oct. 23, 1990

Related U.S. Application Data

[63] Continuation-in-part of Ser. No. 475,604, Feb. 6, 1990.

[51] Int. Cl.$^5$ ............................................. B65D 33/16
[52] U.S. Cl. ................................. 604/415; 428/34.6; 604/403; 604/400
[58] Field of Search ............... 604/403, 408–415; 428/262, 34.6

[56] References Cited

U.S. PATENT DOCUMENTS

| | | | |
|---|---|---|---|
| 3,576,650 | 3/1971 | Underwood et al. | 604/408 |
| 3,746,001 | 7/1973 | Ralston, Jr. | 604/408 |
| 3,942,529 | 3/1976 | Waage | 604/408 |
| 4,018,911 | 4/1977 | Lionetti et al. | 424/101 |
| 4,131,200 | 12/1978 | Rinfret | 604/410 X |
| 4,198,972 | 4/1980 | Herb | 604/408 |
| 4,212,299 | 7/1980 | Yokokoji et al. | |
| 4,322,298 | 3/1982 | Persidsky | 210/516 X |
| 4,365,629 | 12/1982 | Pert et al. | 604/408 |
| 4,482,585 | 11/1984 | Ohodaira et al. | 604/408 |
| 4,496,362 | 1/1985 | Leurink | 604/408 |
| 4,596,573 | 6/1986 | Donnan et al. | 604/415 |
| 4,723,956 | 2/1988 | Schnell et al. | |
| 4,976,708 | 12/1990 | Oshiyama | |
| 4,994,057 | 2/1991 | Carmen et al. | |

FOREIGN PATENT DOCUMENTS

WO8904280 5/1989 United Kingdom ............... 31/14

Primary Examiner—Robert A. Hafer
Assistant Examiner—Kerry Owens

[57] ABSTRACT

This invention relates to containers for the cryopreservation of mammalian cells and particularly for the long-term freezing of red blood cell. This invention also relates to methods of manufacturing such containers.

13 Claims, 6 Drawing Sheets

BLOOD CRYOPRESERVATION CONTAINER

FIELD OF THE INVENTION

The present application is a continuation-in-part of U.S. Ser. No. 07/475,604, filed Feb. 6, 1990.

This invention relates to novel containers for the storage of mammalian cells and particularly for the long term cryopreservation of red blood cells.

BACKGROUND OF THE INVENTION

This invention relates to an improved container for the cryopreservation of mammalian cells and particularly for the long-term cryopreservation of red blood cells. The cryopreservation, or freezing, of red blood cells is a relatively recent development in the medical area. One of the processes used for the freezing of red blood cells is described in U.S. Pat. No. 4,018,911 which describes a method of freezing red blood cells using hydroxyethyl starch (HES) as a cryoprotectant. This patent however, does not address the problems associated with providing an appropriate blood compatible container which incorporates the particular characteristics needed for freezing with liquid nitrogen.

One commercially available bag for cryopreservation of blood components is made by Gambro. Its utility for red blood cell cryopreservation is limited, however, because the spike ports protrude and can be damaged at liquid nitrogen temperatures. The presence of these parts usually require these bags to be stored in metal containers, thereby using valuable space in the storage cabinets. If one removes the protruding parts at any time, the integrity of the bags content is compromised.

Ideally, a container for cryopreservation in liquid nitrogen should have a number of properties. It should 1) not break or leak at any time during the process, 2) allow for rapid, easy insertion and removal of a spike during transfusion, 3) provide a flat transfusion port so that a large quantity of these containers can be stored without metal frames which require a lot of additional space, and 4) all spike ports, including the transfusion port should be designed in such a manner as to eliminate protrusions which could break off at low temperatures during handling In addition, since the containers will be frozen in liquid nitrogen and stored in liquid nitrogen vapor, it should have low nitrogen permeability and good low temperature properties.

SUMMARY OF THE INVENTION

The present invention provides a container suitable for the cryopreservation of mammalian cells including bone marrow cells and red blood cells (RBCs), prepared using a polyimide film layer coated with one or more fluoropolymer films (hereinafter "polyimide/fluoropolymer coated film") which afford the advantages of medical storage bags previously available for the cryopreservation of cells, combined with the advantage of a flat transfusion port tab insert which allows a large number of these bags filled with blood, to be stacked one on top of another for freezing without secondary containers such as known in the prior art. In addition, the resilient nature of the spike-through material used in the transfusion port tab insert provides a means for holding in place a spike from an administration set inserted into the port for the transfusion of RBCs to the patient.

Specifically, the instant invention provides, in a container comprising a body made from one or more layers of polyimide/fluoropolymer coated film (3), a filling port (2) and a transfusion port sealed between said layers, the improvement comprising the transfusion port being incorporated into a transfusion port tab insert (1) comprising:

(a) optionally one or more polyimide/fluoropolymer coated film layers (10) bondable on one side to the inside of the body of the container;

(b) optionally one or more fluoropolymer film layers (15) bondable to the fluoropolymer layer of the polyimide/fluoropolymer coated film (3), or optionally bondable to (10);

(c) one or more strips of spike-through material (12) intimately contacting on one side, the inside of the polyimide/fluoropolymer coated film layers (10) or intimately contacting the fluoropolymer film (15), said spike-through material having a high degree of resilience; and (d) one or more strips of material (11) being non-bondable to the spike-through material (12);

wherein the film layers (10), (12) and/or (15) are sealed peripherally (13) on each side of the transfusion tab insert (1) and one or more additional seals are made across the width of the transfusion port tab insert perpendicular to the peripheral seals (13) such that the spike-through material (12) is sealed to itself, except to the extent that the strip of material (11) prevents such bonding.

Preferably, the spike-through material (12) is a highly resilient material such as a polyester elastomer which provides a means for holding a spike inserted therein in place during the transfusion of red blood cells and which provides a liquid-tight seal around such inserted spike. In addition the material must withstand freezing in liquid nitrogen and storage in liquid nitrogen vapor.

In an embodiment of this invention a cryoprotectant amount of HES is placed in the container during manufacture via the filling port, this filling port being optionally removable, and preferably removed, after mammalian cells and HES are added to the container and before cryopreservation thereof.

DETAILED DESCRIPTION

There is provided a container comprising a body made from one or more layers of a polyimide film coated with one or more layers of a fluoropolymer film (hereinafter a polyimide/fluoropolymer coated film)

(3), a filling port (2) and a transfusion port sealed between said layers, the improvement comprising the transfusion port being incorporated into an transfusion port tab insert (1) comprising:
(a) optionally one or more polyimide/fluoropolymer coated film layers (10) bondable on one side to the inside of the body of the container;
(b) optionally one or more fluoropolymer film layers (15) bondable to the fluoropolymer layer of the polyimide/fluoropolymer coated film (3) comprising the body of the container or optionally bondable to (10);
(c) one or more strips of spike-through material (12) intimately contacting on one side, the inside of the polyimide/fluoropolymer coated film (10), or intimately contacting the fluoropolymer film (15) said spike-through material having a high degree of resilience; and
(d) one or more strips of material (11) being non-bondable to the spike-through material (12);
wherein the films (10), (12) and/or (15) being sealed peripherally (13) on each side of the transfusion port tab insert and one or more additional seals are made across the width of the transfusion port tab insert (1) perpendicular to the peripheral seals (13) such that the spike through material (12) is sealed to itself, except to the extent the strip of material (11) prevents such binding.

Referring to the FIGS. 1 through 7, several embodiments of the invention are disclosed. The container is made of one or more sheets of polyimide/fluoropolymer coated film layers (3) which are sealed together peripherally to form a closed container. The preferred film is a laminate film having a polyimide core coated or laminated with a fluoropolymer, for example a laminate film such as Kapton ® FN, commercially available from E. I. du Pont de Nemours, which is a polyimide film coated with Teflon ® FEP. Other fluoropolymers such as polytetrafluoroethylene, perfluoroalkoxy and fluorinated ethylene propylene copolymer (FEP), can be used. The seals (5) are preferably made using a hot bar sealer. Additionally, other means of sealing such as with thermal impulse sealers, lasers, or indirect radio frequency sealers, may be used. Seals can be from about 0.081 cm to about 1.91 cm wide and preferably are about 0.64 cm wide and can be more than one seal in parallel. Seals in the corners of the container are preferably made in such a way as to reduce mechanical stress in the corners and to reduce areas of the container in which red blood cells will not survive.

The top of the container may carry other peripheral seals and one or more suspension holes (4) for hanging the container during usage. In a preferred embodiment, the container is filled during manufacture with a starch solution (6) in an amount sufficient for the cryopreservation of red blood cells.

Figure 7:
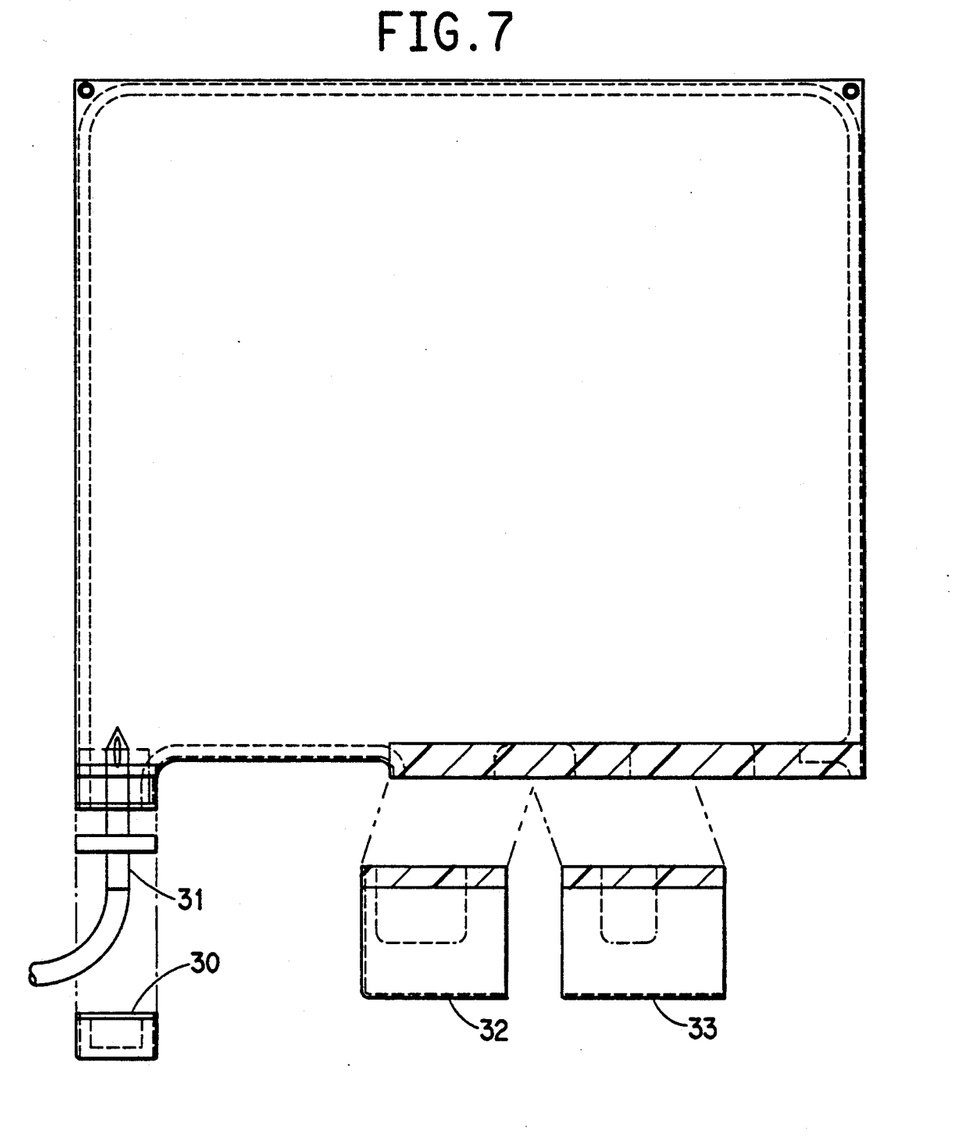
FIG. 7 is a plan view of the container post-filling with HES and red blood cells and post freezing and thawing with a transfusion spike inserted therein.
Figure 7A:
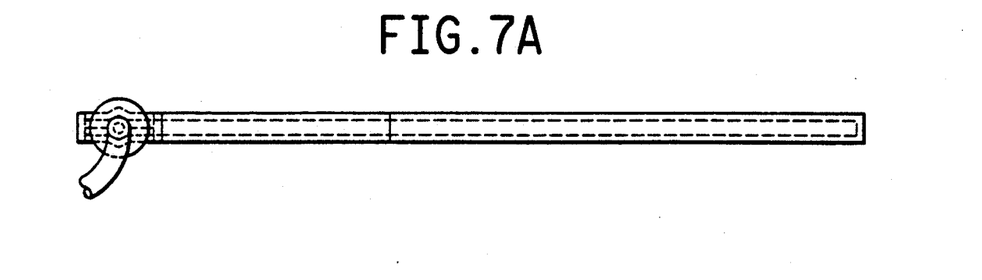

In addition the container can optionally, and preferably has one or more sample blood pocket(s) (32,33) wherein a small sample of the cells in a HES mixture, are stored. These blood pockets (32,33) are removable at any time before or after freezing, however, they are preferably removed after freezing and thawing but before infusion such that the RBCs stored therein can be tested and cross matched for blood type and for detection of infectious disease prior to being infused. These pockets (32,33) can be removed by any manner known to those skilled in the art, such that contamination risk is limited. For example, seals (21) can be made across the width of such pockets and a cut can be made as shown in FIG. 7 (22).

Figure 1:
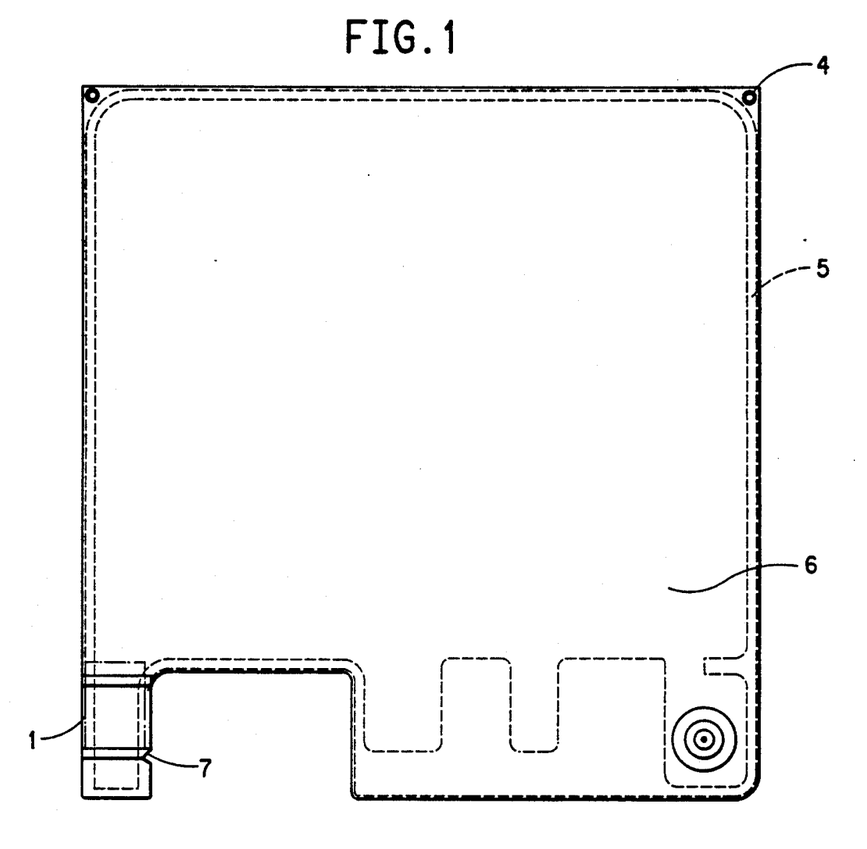
FIG. 1 is a plan view of a flexible container utilizing the invention of this application.

In a preferred embodiment of this invention, as shown in FIG. 1, the transfusion port tab insert (1), has one or more notches (7) at which point the end user can remove the transfusion port tab insert, in an easy manner such as by tearing. This method of removal provides an easy process with less risk of contamination than by other methods, such as cutting. In addition, no additional equipment is required for the operation.

Figure 2:
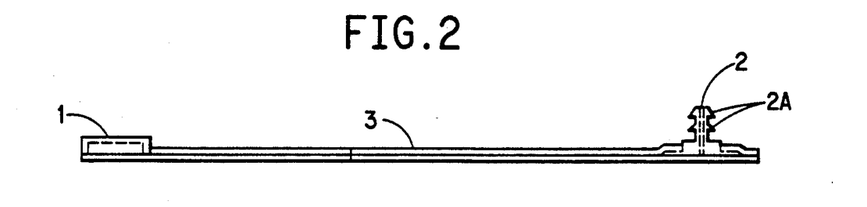
FIG. 2 is a side elevational view of the container of FIG. 1.
Figure 6:
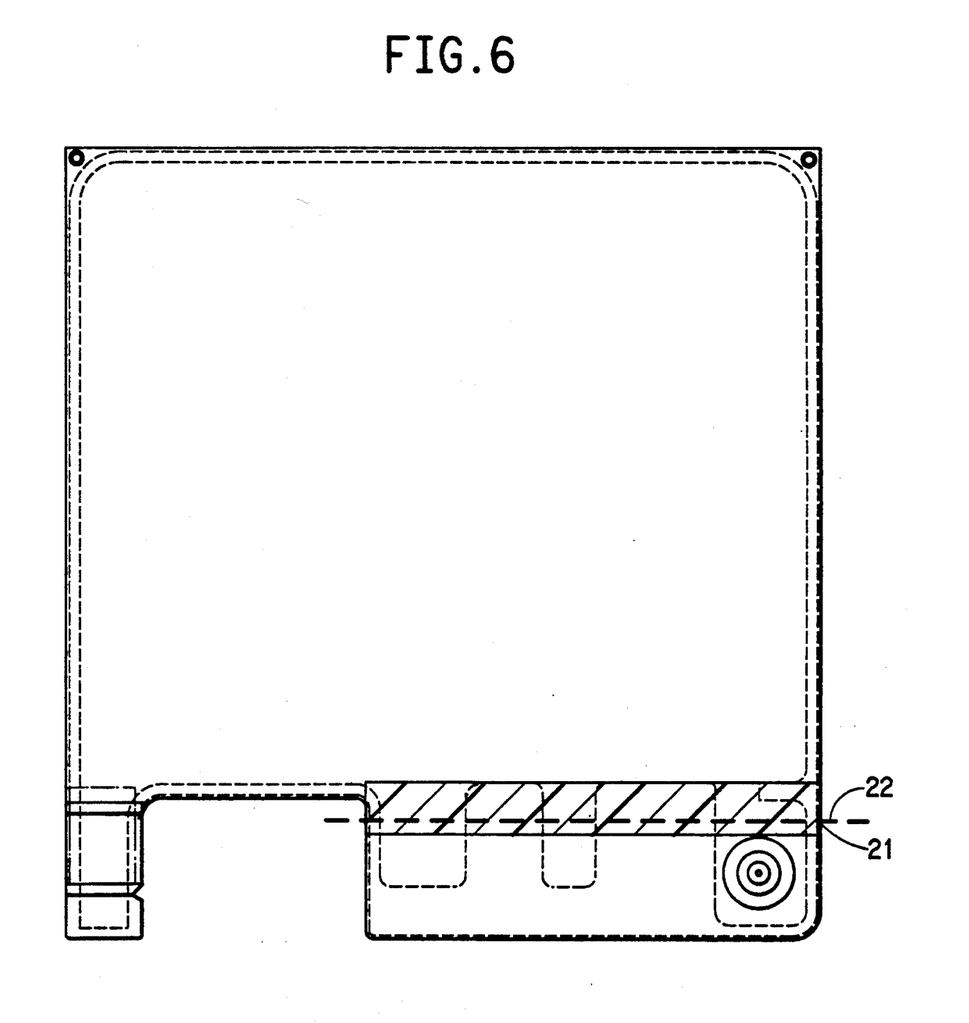
FIG. 6 is a plan view of the container filled with HES and blood, prior to draining.

As shown in FIG. 2, a filling port (2) is a molded port protruding from the container for the filling of the container with starch solution during manufacture and red blood cells by user. This filling port must have a sealing means, such as sealed tubing connected to it so that a closed system is provided. Other means, such as a Y port, for closing the system at the filling port (2) are within those known to people skilled in the art. This filling port (2) is optionally removable by methods known to those skilled in the art such as shown in FIGS. 6 and 7. Prior to removal, the user must use any commercially available bar sealer to place filling port tab removal seals (21) across the filling tab. The filling port may then be removed by cutting or tearing at the location (22) between the seals (21). The port (2) is preferably made of fluorinated ethylene propylene copolymer, perfluoroalkoxy or polytetrafluoroethylene (commercially available as Teflon ® FEP, PFA or PTFE), preferably injection-molded. The port has a through-hole for passage of a solution such as starch and red blood cells or other cells such as bone marrow to be stored therein, and a wide flange at the base which is bonded to the inside of the container. The top of the port extends outside the container through a hole in the container film larger than the diameter of barbs (2A) thereon but smaller than the flange diameter. The port (2) has one or more barbs (2A) for holding tubing placed on the port, the tubing being held onto the barb(s) preferably by mechanical press-fit, although adhesives may be used.

Figure 5:
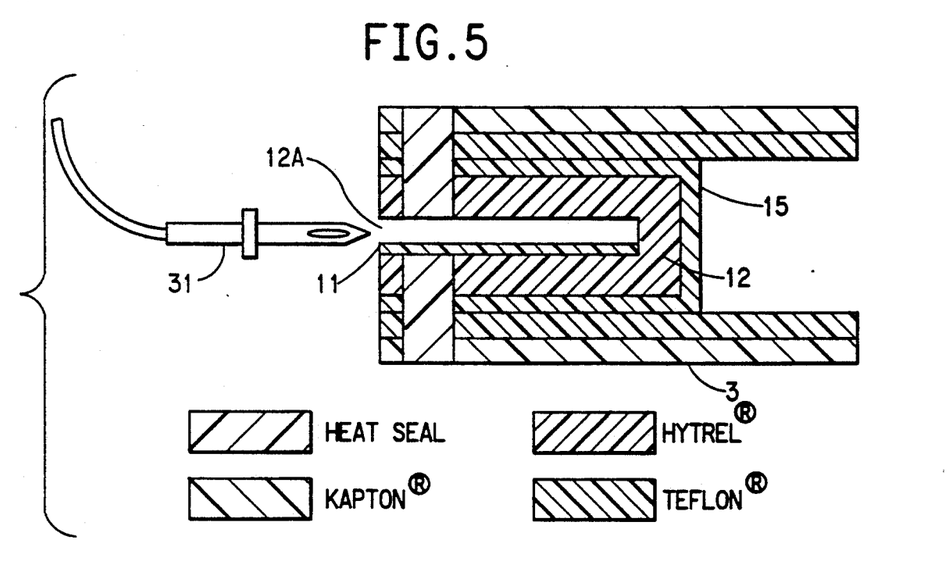
FIGS. 5 and 5A are fragmentary, cross-sectional views of the transfusion port tab inserts to be sealed within the container of FIGS. 1 and 2 and having transfusion spikes inserted therein.
Figure 5A:
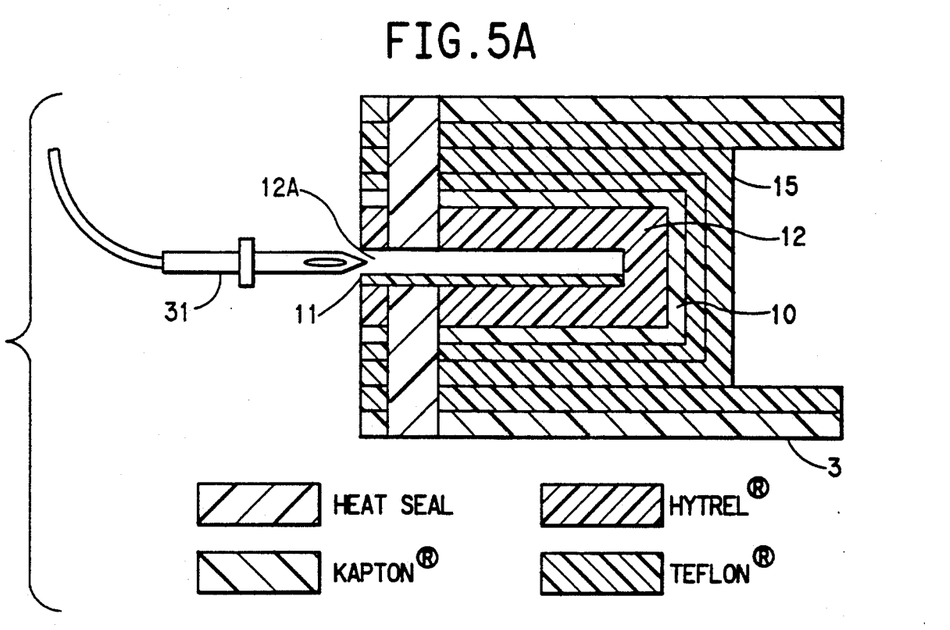

Referring to FIGS. 3 through 5A, the transfusion port tab insert (1) is sealed within the layers of polyimide/fluoropolymer coated film layers comprising the body (3) of the container. As shown in FIGS. 3A and 5A. The transfusion port tab insert (1) comprises one or more layers of a polyimide/fluoropolymer coated film (10) which is preferably a double-bond or laminated film such as Kapton ®FN, which is bondable on one side to the inside layer of the polyimide/fluoropolymer coated film (3) for example a Teflon ® to Teflon ® bond, and which is bondable on the other side to the spike-through material (12) for example, a polyimide (Kapton ®) to polyester elastomer (Hytrel ®) bond. Optionally, the layer (10) in the transfusion tab insert may have an additional layer of fluoropolymer film (15) as a backing on the layer (10). The films (10, 12, 3 and optionally 15) being sealed peripherally (13) on each side of the transfusion port tab insert. The strip (11) which is non-bondable to (12) prevents the spike-through (12) material from bonding to itself during manufacture. The strip (11) is preferably Teflon ®FEP although other fluoropolymers and other polymers and metal that do not bond to the spike-through material (12) will work. The material (11) can be from about 0.0005 to about 0.010 inches thick, preferably about 0.002 inches thick. This material (11) remains inside the port and is slightly smaller in width than the spike-through material (12) so that the spike-through material (12) can bond to itself at the outer most edges but will not otherwise bond to itself, thereby providing a channel (12A) for the insertion of a spike.

The spike-through material (12) is preferably a polyester elastomer such as Hytrel ® which is commercially available from E. I. du Pont de Nemours and Company. The advantage of using a film such as Hytrel ® is that its resilient nature provides a means for holding any transfusion spike inserted therein in place during the transfusion of cells from the container to the patient. In addition, it will create a liquid-tight seal around an object, such as a spike inserted into the spike-through material (12) or Hytrel ® layer. Further properties of Hytrel ® which make it preferable in the present invention are that it is autoclavable and can withstand low temperatures such as needed for freezing and/or storage in liquid nitrogen.

Figure 3:
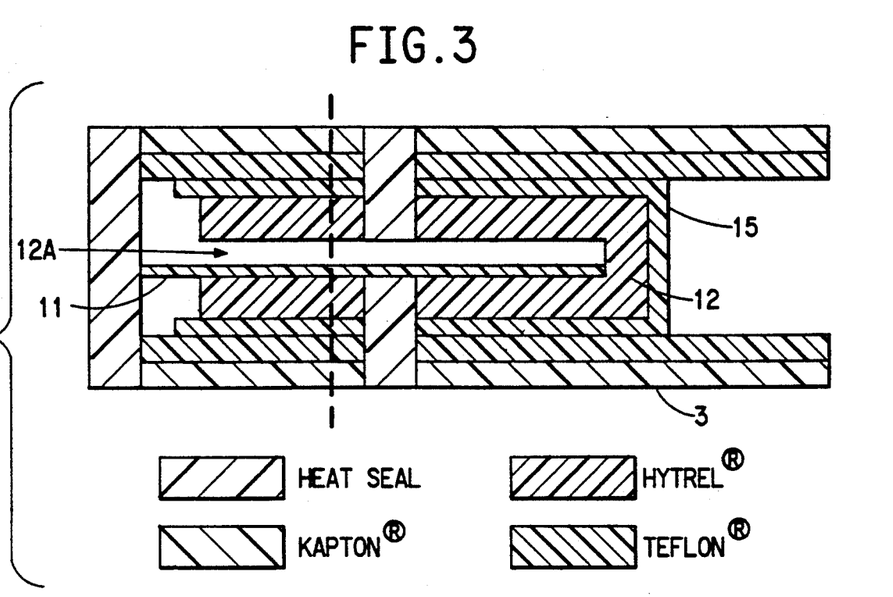
FIGS. 3 and 3A are fragmentary, cross-sectional views of the transfusion port tab inserts to be sealed within the container of FIGS. 1 and 2.
Figure 3A:
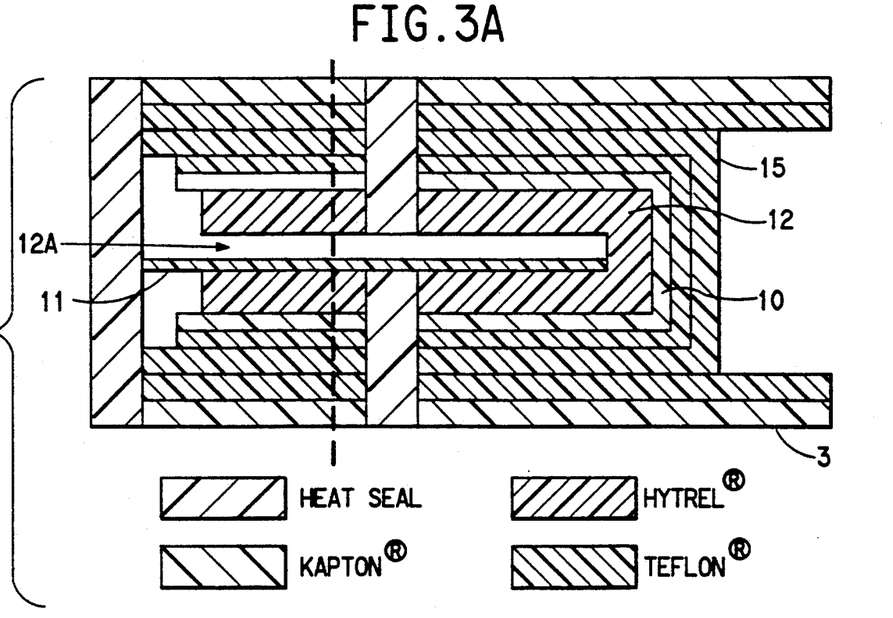
Figure 4A:
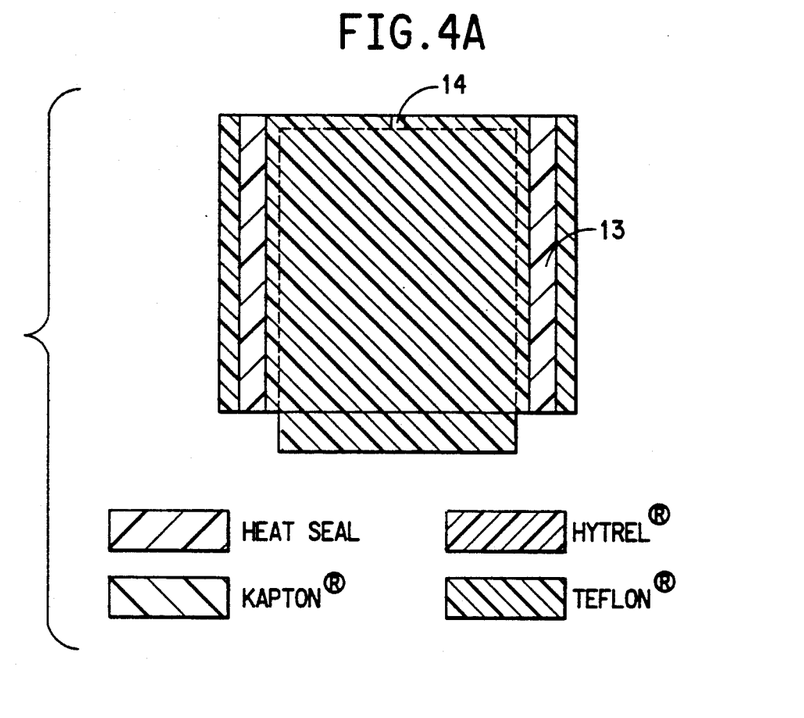
FIG. 4 is top, front and side views of the transfusion port tab insert.
Figure 4B:
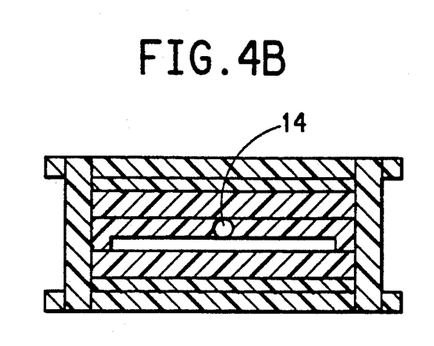
Figure 4C:
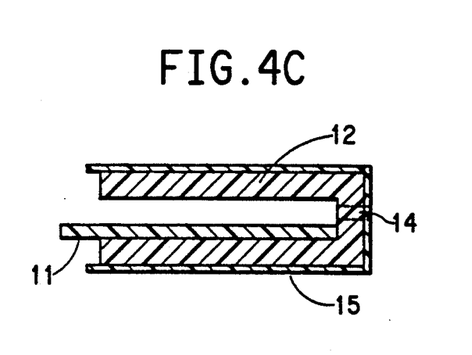

As shown in FIGS. 3 and 5, in a preferred embodiment of the present invention, a single layer of polyester elastomer film such as Hytrel ® is folded inside the fluoropolymer layer (15) to form the transfusion port tab insert. The spike-through material (12), preferably Hytrel ® is in intimate contact with layer (15) and the layers (15) and (12) are sealed along the sides of the transfusion port tab insert providing a channel (12A) through which a spike can be inserted. Most preferably, the transfusion port tab insert comprises one layer of Hytrel ® which is laid on one layer of Teflon ®, the assembly is cut to size, folded such that the Teflon ® is on the outside and the Hytrel ® is on the inside. Additionally, the non-bondable layer (11) is inserted between the folded Hytrel ® layer so that the Hytrel ® does not bond to itself during manufacture. This assembly is then sealed into the container as previously described.

This embodiment is easier to manufacture, eliminates the Kapton ® layers and eliminates an additional sealing step. Assembly is easier because the Hytrel ® and Teflon ® layers remain in intimate contact during subsequent processing due to the static charge of the Teflon ® and the gumminess of the Hytrel ®. This intimate contact eliminates the need for sealing these two films. In this embodiment of the transfusion port tab insert, the spike-through material (12) is easy to spike because of the Teflon ® backing layer and retains a holding force equivalent to embodiments comprising additional layers of various films.

As shown in FIGS. 3 and 4, prior to transfusing any solution in the container, the user must partially remove the transfusion port tab insert by a means such as tearing at the notches (7) provided in the transfusion port tab insert. As shown in FIGS. 3, 5 and 7 a tear is made in the transfusion port tab at the end opposite the spike insertion point (14) which is the point at which a spike penetrates the spike-through material (12) and thereby enters the otherwise closed system. This tear provides access to the channel (12A) for the insertion of a spike (31). A portion (30) of the transfusion port tab is removed after the tear is made and is discardable in compliance with biohazardous waste removal practices.

Optionally, at the folded portion of the spike-through layer (12), the layer (12) is predisposed to penetration by a spike inserted therein. Such predisposition being made at the spike insertion point (14) by means such as providing a small hole in the layer (12) or by thinning the spike-through material (12) at this point or by creating perforations in the spike-through material 12) at this point. Preferably if a predisposition to penetration is present, it is placed at the center of the width of the spike-through material (12). Any predisposed spike insertion point is preferably smaller than the diameter of any spike to be inserted therein. In the preferred embodiment comprising a layer (12) intimately contacting layer (15) no predisposition for the spike is provided thereby maintaining the closed system and reducing the likelihood of contamination. In addition, this will make manufacture of the spike port tab insert and the overall container easier.

The characteristics of Hytrel ®, particularly its resilient nature will cause a liquid-tight seal to be formed around any spike inserted therein, thus preventing any leakage of the cells and particularly red blood cells stored in the container, during the transfusion of such cells into a patient. This will prevent not only loss of the limited red blood cell supply, but also will reduce the likelihood of medical personnel being exposed to spilled red blood cells which may carry infectious diseases.

What is claimed is:

1. In a container comprising a body of a laminate film (3) having a layer of a polyimide film facing the outside of the container and a fluoropolymer film layer facing the inside of the container, a filling port (2), and a transfusion port sealed between said laminate film (3), the improvement comprising the transfusion port being incorporated into a transfusion port tab insert (1) comprising:
    (a) a fluoropolymer film layer (15) being bonded to the fluoropolymer film layer of (3) which is facing the inside of the container;
    (b) a laminate film (10) having a polyimide layer and a fluoropolymer film layer, the fluoropolymer film layer of (10) being bonded to the fluoropolymer film layer (15);
    (c) at least one strip of piercable spike-through material (12) made of a thermoplastic polyester elastomer film, the spike-through material (12) being bonded to the polyimide layer of (10), said spike-through material having a high degree of resilience; and
    (d) a strip of material (11) being non-bondable to the spike-through material (12);
    wherein (12), (10), and (15) are bonded thereby forming peripheral seals (13) made on each side of the tab insert (1), such that the spike-through material (12) is sealed to itself, except to the extent that the non-bondable strip of material (11) prevents such bonding, and the film (10) is sealed to the spike-through material (12) and optionally an additional seal is made across the width of the spike port tab insert (1) perpendicular to the peripheral seals (13).

2. A container of claim 1 wherein the fluoropolymer film of the laminate films (3) an (10) is selected from the group consisting of polytetrafluoroethylene, tetrafluoroethylene-hexafluoropropylene copolymer, and perfluoroalkoxy resin.

3. A container of claim 1 wherein the non-bondable strip of material (11) is a fluoropolymer strip.

4. A container of claim 1 wherein the polyester elastomer film is about 0.0005 to about 0.060 inches thick.

5. A container of claim 4 wherein the polyester elastomer film is about 0.005 inches thick.

6. A container of claim 1 wherein the filling port (3) is optionally removable prior to cryopreservation of the container and mammalian cells therein.

7. A container of claim 1 wherein one or more sample blood pocket(s) (32,33) are sealed within the polyimide/fluoropolymer coated film layers (3) comprising the body of the container.

8. A container of claim 1 wherein the transfusion port tab insert (1) provides a means for partially removing such tab to provide access to a channel (12A).

9. A container of claim 8 wherein the means for removal is one or more notches (7) for tearing provided in the transfusion port tab insert.

10. In a container comprising a body of a laminate film (3) having a layer of a polyimide film facing the outside of the container and a fluoropolymer film layer facing the inside of the container, a filling port (2), and a transfusion port sealed between said laminate film (3), the improvement comprising the transfusion port being incorporated into a transfusion port tab insert (1) comprising:
  (a) a laminate film (10) having a polyimide layer and a fluoropolymer film layer, the fluoropolymer film layer of (10) being bonded to the fluoropolymer film layer of (3) which is facing the inside of the container;
  (b) at least one strip of piercable spike-through material (12) made of a thermoplastic polyester elastomer film, the spike-through material (12) being bonded to the polyimide layer of (10), said spike-through material having a high degree of resilience; and
  (c) a strip of material (11) being non-bondable to the spike-through material (12);
  wherein (12) and (10) are bonded thereby forming peripheral seals (13) made on each side of the tab insert (1), such that the spike-through material (12) is sealed to itself, except to the extend that the non-bondable strip of material (11) prevents such bonding, and the film (10) is sealed to the spike-through material (12) and optionally an additional seal is made across the width of the spike port tab insert (1) perpendicular to the peripheral seals (13).

11. A container of claim 10 wherein one or more sample blood pocket(s) (32,33) are sealed within the polyimide fluoropolymer coated film layers (3) comprising the body of the container.

12. A container of claim 10 wherein the transfusion port tabs insert provides a means for partially removing such tab insert (1) to provide access to a channel (12A).

13. The container of claim 12 wherein the means for removal is one or more notches (7) for tearing provided in the transfusion port tab insert.

* * * * *